United States Patent
Yu et al.

(10) Patent No.: US 12,455,533 B2
(45) Date of Patent: Oct. 28, 2025

(54) HOLOGRAPHIC DISPLAY DEVICE

(71) Applicant: SAMSUNG ELECTRONICS CO., LTD., Suwon-si (KR)

(72) Inventors: Hyeonseung Yu, Suwon-si (KR); Hoon Song, Yongin-si (KR); Jungkwuen An, Suwon-si (KR); Hongseok Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 979 days.

(21) Appl. No.: 17/502,316

(22) Filed: Oct. 15, 2021

(65) Prior Publication Data
US 2022/0308526 A1  Sep. 29, 2022

(30) Foreign Application Priority Data
Mar. 29, 2021  (KR) ........................ 10-2021-0040539

(51) Int. Cl.
*G03H 1/22* (2006.01)

(52) U.S. Cl.
CPC ....... *G03H 1/2294* (2013.01); *G03H 2226/02* (2013.01)

(58) Field of Classification Search
None
See application file for complete search history.

(56) References Cited

U.S. PATENT DOCUMENTS

| | | | |
|---|---|---|---|
| 2002/0057757 A1 | 5/2002 | Khoury | |
| 2006/0139710 A1 | 6/2006 | Schwerdtner | |
| 2010/0033781 A1 | 2/2010 | Leister | |
| 2010/0046050 A1* | 2/2010 | Kroll | G03H 1/2294 359/9 |
| 2010/0157399 A1 | 6/2010 | Kroll et al. | |
| 2010/0195178 A1 | 8/2010 | Leister et al. | |
| 2010/0289870 A1 | 11/2010 | Leister | |
| 2012/0176665 A1 | 7/2012 | Song et al. | |
| 2013/0335795 A1 | 12/2013 | Song et al. | |
| 2014/0016051 A1 | 1/2014 | Kroll et al. | |
| 2014/0198361 A1 | 7/2014 | Leister et al. | |

(Continued)

FOREIGN PATENT DOCUMENTS

| | | |
|---|---|---|
| DE | 10 2009 044 910 A1 | 12/2010 |
| JP | 2014-209247 A | 11/2014 |

(Continued)

OTHER PUBLICATIONS

Jung-Ping Liu et al., "Complex Fresnel hologram display using a single SLM," Applied Optics, Dec. 1, 2011, vol. 50, No. 34, pp. H128-H135.

(Continued)

*Primary Examiner* — Jyotsna V Dabbi
(74) *Attorney, Agent, or Firm* — Sughrue Mion, PLLC

(57) ABSTRACT

A holographic display device is provided. The holographic display device includes a spatial light modulator for representing a partial complex domain and reproducing a hologram by diffracting light, and a processor for controlling the spatial light modulator. The processor controls the spatial light modulator by employing an algorithm for calculating hologram information according to the representation of the partial complex domain of the spatial light modulator.

14 Claims, 16 Drawing Sheets

(56) References Cited

U.S. PATENT DOCUMENTS

| | | |
|---|---|---|
| 2014/0210960 A1 | 7/2014 | Sung et al. |
| 2014/0285862 A1 | 9/2014 | Song et al. |
| 2016/0085114 A1* | 3/2016 | Oka ................. G02F 1/133504 349/98 |
| 2017/0123204 A1* | 5/2017 | Sung .................... G03H 1/2294 |
| 2018/0129105 A1 | 5/2018 | Kim et al. |
| 2018/0364481 A1 | 12/2018 | Robbins et al. |
| 2019/0056635 A1 | 2/2019 | Kim et al. |
| 2019/0064737 A1 | 2/2019 | Shi |
| 2019/0187614 A1 | 6/2019 | Oh |
| 2019/0278225 A1 | 9/2019 | Futterer et al. |
| 2020/0033672 A1 | 1/2020 | Leister et al. |
| 2020/0278642 A1 | 9/2020 | Kim et al. |
| 2021/0181678 A1 | 6/2021 | Kim et al. |
| 2021/0231996 A1 | 7/2021 | Leister |
| 2022/0299937 A1 | 9/2022 | Kim et al. |

FOREIGN PATENT DOCUMENTS

| | | |
|---|---|---|
| KR | 10-2019-0071586 A | 6/2019 |
| KR | 10-2021-0074157 A | 6/2021 |
| WO | 2004/051323 A1 | 6/2004 |
| WO | 2020/035206 A1 | 2/2020 |
| WO | WO-2020039038 A1 * | 2/2020 ............... G03H 1/02 |

OTHER PUBLICATIONS

V. Duran et al., "Phase-only modulation with a twisted nematic liquid crystal display by means of equi- azimuth polarization states," Optics Express, Jun. 12, 2006, vol. 14, No. 12, pp. 5607-5616.

Communication dated Feb. 18, 2025, issued by the Korean Intellectual Property Office in Korean Application No. 10-2021-0040539.

* cited by examiner

HOLOGRAPHIC DISPLAY DEVICE

CROSS-REFERENCE TO RELATED APPLICATION

This application is based on and claims priority under 35 U.S.C. § 119 to Korean Patent Application No. 10-2021-0040539, filed on Mar. 29, 2021, in the Korean Intellectual Property Office, the disclosure of which is incorporated by reference herein in its entirety.

BACKGROUND

1. Field

The disclosure relates to a holographic display device.

2. Description of Related Art

Recently, research on realizing a holographic display using a spatial light modulator (SLM) has been actively conducted. When light from a light source is collected by a lens and provided to be focused on the viewer's eyes, a three-dimensional holographic image may be created by displaying computer-generated hologram (CGH) information using a spatial light modulator. In this case, a viewing area is determined by a pixel pitch of the spatial light modulator, and the viewing area is very narrow even when a high-resolution panel is used.

Furthermore, when a CGH is represented in a panel, all the viewing area by a pixel pitch may be secured only when phase information and amplitude information of light are all represented. When only amplitude information is represented or only phase information is represented, the viewing area may be reduced further.

SUMMARY

Provided is a holographic display device which may enlarge a viewing window and may be capable of generating a hologram without information loss.

Additional aspects will be set forth in part in the description which follows and, in part, will be apparent from the description, or may be learned by practice of embodiments of the disclosure.

In accordance with an aspect of the disclosure, a holographic display device includes a spatial light modulator representing a partial complex domain and reproducing a hologram by diffracting light; and a processor configured to control the spatial light modulator by employing an algorithm for calculating hologram information according to representation of the partial complex domain of the spatial light modulator.

The spatial light modulator may include a first spatial light modulator and a second spatial light modulator arranged parallel to each other, each of the first spatial light modulator and the second spatial light modulator comprising a plurality of pixel arrays, wherein the spatial light modulator represents the partial complex domain by a combination of the first spatial light modulator and the second spatial light modulator.

The first spatial light modulator may be capable of partial phase modulation, and the second spatial light modulator may include an amplitude modulation spatial light modulator.

The second spatial light modulator may include a TN-LCD panel.

The first spatial light modulator may include a first polarizer, a modulation panel including the plurality of pixel arrays, a quarter wave plate, and a second polarizer, and the first polarizer, the modulation panel, the quarter wave plate, and the second polarizer may be sequentially arranged.

The modulation panel may include a TN-LC panel.

Each of the first spatial light modulator and the second spatial light modulator may include a partial complex modulation panel.

The holographic display device may further include an anti-diffraction filter removing high-order diffraction noise generated due to an aperture size of a pixel of the spatial light modulator.

The holographic display device may further include a backlight unit providing coherent and collimated illumination light.

The holographic display device may further include an anti-diffraction filter removing high-order diffraction noise generated due to an aperture size of a pixel of the spatial light modulator.

The holographic display device may further include a backlight unit providing coherent and collimated illumination light.

The spatial light modulator may be provided to represent 50% or more and less than 100% of full complex information.

The algorithm may set a phase of a target hologram to be constant or random, and may calculate and apply a CGH on a surface of the spatial light modulator by back propagating the phase of the target hologram.

The algorithm may allow the phase of the target hologram to be reproduced by representing a limited random value, within a limit allowed by a complex representation range of the spatial light modulator.

The algorithm, when setting the phase of the target hologram to be random, may limit a phase of the CGH calculated on the surface of the spatial light modulator to fit to the partial complex domain that is representable by the spatial light modulator, by back propagating the phase of the target hologram.

The algorithm may reproduce the hologram with a limited random phase by optimizing such that a difference between an amplitude of a reconstructed hologram reproduced from a limited CGH having a limited phase and an amplitude of an initially set hologram becomes less than a target value.

The algorithm may correct an imperfection of the device through learning of a system parameter.

The system parameter may include a non-uniformity of an incident light pattern or an alignment error of the spatial light modulator.

The spatial light modulator includes a first spatial light modulator and a second spatial light modulator arranged parallel to each other, each of the first spatial light modulator and the second spatial light modulator including a plurality of pixel arrays, wherein the spatial light modulator represents the partial complex domain by a combination of the first spatial light modulator and the second spatial light modulator, wherein the system parameter comprises an alignment parameter of the first spatial light modulator and the second spatial light modulator, and wherein the algorithm optimizes the CGH by estimating the alignment parameter.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
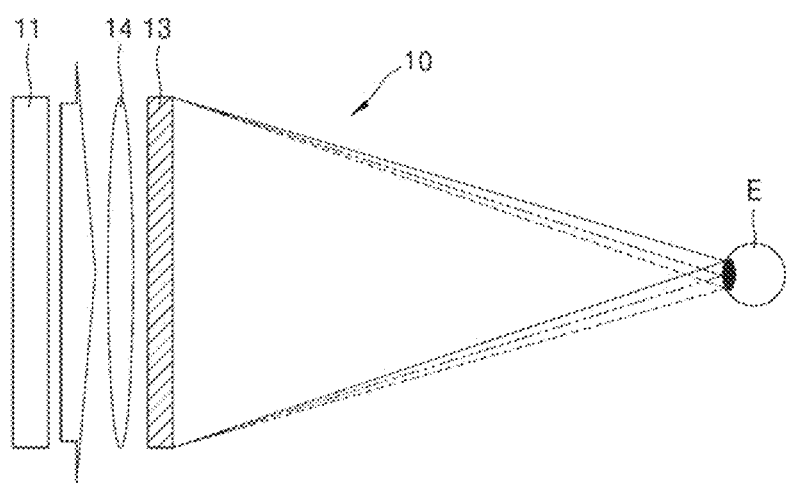
FIG. 1 illustrates an example of a holographic display device having a panel capable of amplitude modulation only.

Reference will now be made in detail to embodiments, examples of which are illustrated in the accompanying drawings, wherein like reference numerals refer to like elements throughout. In this regard, embodiments may have different forms and should not be construed as being limited to the descriptions set forth herein. Accordingly, embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments of the disclosure are described in detail with reference to the accompanying drawings. Throughout the drawings, like reference numerals denote like elements. Sizes of components in the drawings may be exaggerated for convenience of explanation. In the above, although embodiments have been described, these are merely examples, and those skilled in the art to which the disclosure pertains could make various modifications and changes from these descriptions.

When a constituent element is disposed "above" or "on" to another constituent element, the constituent element may be only directly on the other constituent element or above the other constituent elements in a non-contact manner. Terms such as "first" and "second" are used herein merely to describe a variety of constituent elements, but the constituent elements are not limited by the terms. Such terms are used only for the purpose of distinguishing one constituent element from another constituent element. The terms do not limit that the material or structure of the constituent elements are different from one another. An expression used in a singular form in the specification also includes the expression in its plural form unless clearly specified otherwise in context. When a part may "include" a certain constituent element, unless specified otherwise, it may not be construed to exclude another constituent element but may be construed to further include other constituent elements. The use of the terms "a" and "an" and "the" and similar referents in the context of describing the disclosure are to be construed to cover both the singular and the plural.

Also, the steps of all methods described herein can be performed in any suitable order unless otherwise indicated herein or otherwise clearly contradicted by context. The disclosure is not limited to the described order of the steps.

Furthermore, terms such as "portion," "unit," "module," and "block" stated in the specification may signify a unit to process at least one function or operation and the unit may be embodied by hardware, software, or a combination of hardware and software.

Furthermore, the connecting lines, or connectors shown in the various figures presented are intended to represent functional relationships and/or physical or logical couplings between the various elements. It should be noted that many alternative or additional functional relationships, physical connections or logical connections may be present in a practical device.

The use of any and all examples, or language (e.g., "such as") provided herein, is intended merely to better illuminate the disclosure and does not pose a limitation on the scope of the disclosure unless otherwise claimed.

A holographic display is a technology that generates desired three-dimensional hologram information by directly controlling an optical field, and is considered an ultimate three-dimensional display technology that does not cause eye fatigue.

When light from a light source is collected by a lens and provided to be focused on the viewer's eyes, for example, a three-dimensional hologram image may be created by displaying computer-generated hologram (CGH) information using a spatial light modulator (SLM).

In a holographic display device using an SLM, a viewing area is determined by a pixel pitch of the SLM. For example, when a high-resolution panel with a pixel pitch of about 50 μm is applied as an SLM, the viewing area becomes about 5 mm, for example. Furthermore, when a CGH is represented on a panel, the entire viewing area corresponding to the pixel pitch may be secured only when both phase and amplitude information of light are represented.

When only amplitude information is represented like an LCD panel that is currently and widely used as an SLM or only phase information is represented like a liquid crystal on silicon (LCoS)-SLM, the viewing area may be reduced due to the generation of DC information and a conjugate signal.

When a high-resolution panel with further reduced pixel pitch is used or a complex modulation panel that may express both amplitude and phase information is employed, a narrow viewing angle problem of a holographic display may be solved, and it is expected that the existing 2D display may be replaced with an ultimate three-dimensional display.

A holographic display device according to an embodiment may employ a complex modulation panel as an SLM. A holographic display device according to an embodiment may be implemented in a thin and flat panel structure, and may be applied to all fields of mobile displays, for example, 3D tablets, 3D mobile phones, 3D smartphones, and the like. In addition, a holographic display device according to an embodiment may be applied to various electronic apparatuses.

A holographic display device according to an embodiment reproduces a three-dimensional hologram, provides an image with a sense of depth in space, and directly reproduces an optical field of an actual three-dimensional image, so that a realistic and fatigue-less image may be provided.

A holographic display device according to an embodiment uses an interference effect of light to reproduce the optical field, and accordingly, uses collimating light emitted from a coherent light source. A holographic display device according to an embodiment may use a collimation backlight unit having a waveguide and a grating-based light exit structure to reduce the thickness of a display.

Meanwhile, in order to secure a viewing angle and an image size of the holographic display device, a very high-resolution spatial light modulation information amount and data processing are required. In order to overcome these limitations, a holographic display device according to an embodiment may be provided to reproduce a hologram in a limited area by focusing light on both eyes of an observer by using a flat lens and the like. Furthermore, a holographic display device according to an embodiment may be provided to measure a changed position through eye-tracking when the observer's eye moves, and move a projection direction by reprocessing a CGH that is hologram reproduction information or adjusting a beam deflector according to an eye-tracking signal.

In order to represent a realistic three-dimensional image by expressing the optical field by a holographic display device, both the amplitude and phase of light are reproduced, but currently widely used panels may control only the amplitude or only the phase.

In contrast, according to a holographic display device according to an embodiment, as an SLM capable of representing a partial complex domain is employed, both the amplitude and phase may be modulated.

Figure 2:
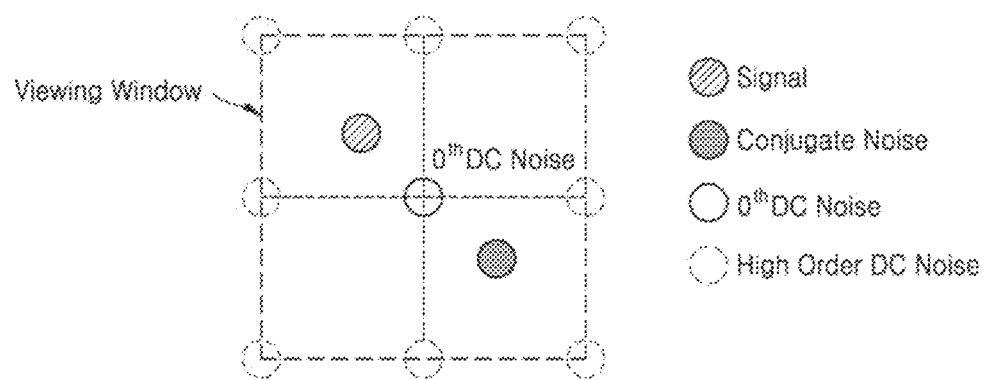
FIG. 2 illustrates a viewing window formed by the holographic display device of FIG. 1.

FIG. 1 illustrates an example of a holographic display device 10 having a panel capable of amplitude modulation only. FIG. 2 illustrates a viewing window formed by the holographic display device 10 of FIG. 1.

Referring to FIG. 1, the holographic display device 10 may include a backlight unit 11, an SLM 13, and a lens 14 for focusing a holographic image in space. When an LCD panel is applied as the SLM 13, the SLM 13 may be capable of amplitude modulation only.

As shown in FIG. 1, when only amplitude modulation is possible, for representing a CGH to reproduce a hologram in the SLM 13, a process of converting complex information into the intensity of light is essential, and at this time, information loss is essentially generated.

Accordingly, as shown in FIG. 2, not only a hologram signal to be shown in a viewing window, but also a 0th-order DC and a conjugate signal are generated together. Accordingly, an actual area to be correctly observed by an observer is a very narrow area that excludes an area of 0th-order DC noise and conjugate signal noise in the viewing window. This phenomenon may identically appear not only in an amplitude modulation SLM, but also in an SLM capable of representing a phase only. Consequently, in order to represent a signal beam only without the DC and the conjugate signal, a complex modulation SLM capable of modulating both an amplitude and a phase is necessary.

A holographic display device according to an embodiment described below may be capable of modulating both the amplitude and the phase by employing an SLM that represents a partial complex domain.

Figure 3:
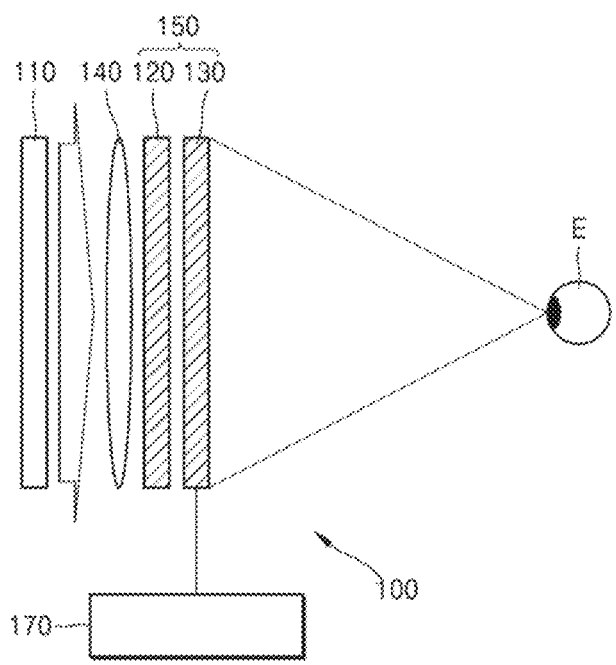
FIG. 3 schematically illustrates a holographic display device according to an embodiment.

FIG. 3 schematically illustrates a holographic display device 100 according to an embodiment.

Referring to FIG. 3, the holographic display device 100 according to an embodiment may include an SLM 150 representing a partial complex domain and reproducing a hologram by diffracting light, and a processor 170 controlling the SLM 150 by employing an algorithm for calculating hologram information according to the representation of a complex domain of the SLM 150. Furthermore, the holographic display device 100 according to an embodiment may further include a backlight unit 110 providing coherent collimated illumination light and a lens, for example, a Fourier lens 140, focusing a holographic image in space. Although, in the drawings, the Fourier lens 140 is illustrated as being arranged at a light incident side of the SLM 150, that is, between the backlight unit 110 and the SLM 150, the position of the Fourier lens 140 is not necessarily limited thereto. For example, the Fourier lens 140 may be arranged at a light exit side of the SLM 150.

The backlight unit 110 may include a collimation backlight unit providing coherent collimated illumination light to enable reproduction of an optical field using a light interference effect. To this end, the backlight unit 110 may include a coherent light source for example, a laser diode. The backlight unit 110 may include any light source capable of emitting light having spatial coherence, in addition to the laser diode. Furthermore, the backlight unit 110 may further include an optical system for generating collimated parallel light having a uniform intensity distribution by enlarging the light emitted from the laser diode. Furthermore, the backlight unit 110 may have a waveguide and a grating-based light exit structure, to reduce the thickness of the holographic display device 100 according to an embodiment. Furthermore, the backlight unit 110 may be provided to constitute a larger surface light source than an active area of the SLM 150.

The backlight unit 110 may provide parallel coherent illumination light having a uniform intensity distribution to an entire area of the SLM 150.

The SLM 150 may be configured to diffract and modulate illumination light input according to a hologram data signal provided from the processor 170, for example, a CGH data signal. The SLM 150 may represent a partial complex domain by a combination of first and second SLMs 120 and 130 arranged parallel to each other. The first and second SLMs 120 and 130 may be provided to separately perform a partial phase modulation and an amplitude modulation, or to perform a partial complex modulation each.

For example, one of the first and second SLMs 120 and 130 may be provided as an SLM capable of partial phase modulation, and the other may be an SLM capable of amplitude modulation (an amplitude modulation panel). Furthermore, each of the first and second SLMs 120 and 130 may include a partial complex modulation panel, and may be provided to modulate an amplitude and a phase by a combination of the two partial complex modulation panels.

In this state, each of the first and second SLMs 120 and 130 may include a plurality of active areas arranged two dimensionally to display a hologram pattern to diffract illumination light. For example, each of the first and second SLMs 120 and 130 may include a plurality of pixel arrays, and the pixel arrays may be arranged two dimensionally in each of the first and second SLMs 120 and 130. A driving circuit for controlling an operation of an active area of each of the first and second SLMs 120 and 130 may be arranged, and at least any one of the amplitude and the phase of light may be modulated in each active area under the control of the driving circuit. For example, a liquid crystal device (LCD), a semiconductor modulator, an LCoS, and the like may be applied as the first and second SLMs 120 and 130, and may be driven to represent a partial complex domain according to the combination of the first and second SLMs 120 and 130.

Figure 4:
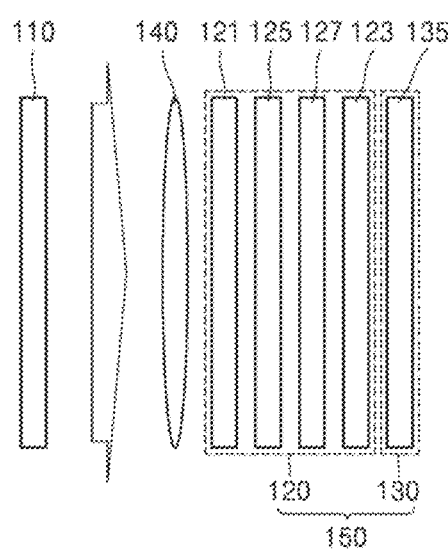
FIG. 4 illustrates an example of a configuration of a spatial light modulator that is applicable to the holographic display device of FIG. 3.

When one of the first and second SLMs 120 and 130 is provided as an SLM capable of partial phase modulation, and the other includes an SLM capable of amplitude modulation (an amplitude modulation panel), each of the first and second SLMs 120 and 130 may include, for example, a liquid crystal panel, as illustrated in FIG. 4.

FIG. 4 illustrates an example of a configuration of the SLM 150 that is applicable to the holographic display device 100 of FIG. 3.

Referring to FIG. 4, one of the first and second SLMs 120 and 130 (e.g., the SLM 120) of the SLM 150 may be provided to be capable of partial phase modulation, and the other (e.g., the SLM 130) may include an amplitude modulation panel 135. FIG. 4 illustrates a case in which the first SLM 120 is provided as an SLM capable of partial phase modulation, and the second SLM 130 includes the amplitude modulation panel 135, but the disclosure is not limited thereto. For example, the first SLM 120 may include an amplitude modulation panel, and the second SLM 130 may be provided as an SLM capable of partial phase modulation.

The first SLM 120 may include, to be capable of partial phase modulation, a modulation panel 125, a first polarizer 121 arranged in front of the modulation panel 125, a second polarizer 123 arranged at the back of the modulation panel 125, and a quarter wave plate 127 arranged between the modulation panel 125 and the second polarizer 123. In other words, the first SLM 120 may include an arrangement in the order of the first polarizer 121, the modulation panel 125, the quarter wave plate 127, and the second polarizer 123. The second SLM 130 may include the amplitude modulation panel 135.

In FIG. 4, the first polarizer 121, the modulation panel 125, the quarter wave plate 127, and the second polarizer 123, forming the first SLM 120, are separated from one another, and these constituent elements may be combined with each other to form a panel structure, and may constitute a phase modulation panel.

Each of the first SLM 120 and the second SLM 130 may include, for example, a liquid crystal panel. In other words, for example, a liquid crystal panel may be applied to as the modulation panel 125 of the first SLM 120. For example, a twisted nematic liquid crystal (TN-LC) panel may be applied as the modulation panel 125 of the first SLM 120. The second SLM 130 may include a liquid crystal panel that is capable of amplitude modulation, as the amplitude modulation panel 135. For example, a TN-LCD panel may be used as the amplitude modulation panel 135 for the second SLM 130. The TN-LC panel may correspond to a structure without a polarizer in the TN-LCD panel.

FIG. 4 illustrates that a liquid crystal panel is applied to each of the first SLM 120 and the second SLM 130, but the disclosure is not limited thereto.

Each of the first and second SLMs 120 and 130 of the SLM 150 may include a partial complex modulation panel, and an optical field of a hologram may be modulated by a combination of the two partial complex modulation panels. Each partial complex modulation panel may divide, for example, the partial complex domain, into a plurality of phase sections, and have optical patterns to modulate amplitude values corresponding to each phase section. The amplitude values may be adjusted by at least any one of the width and the length of the optical patterns.

A hologram to be shown in the holographic display device 100 according to an embodiment includes amplitude information and phase information. When an amplitude and a phase in a pixel (m,n) of the SLM 150 are $A_{(m,n)}$ and $\varphi_{(m,n)}$, respectively, the optical field of a hologram is represented by $A_{(m,n)}\exp(j\varphi_{(m,n)})$.

Accordingly, as described above, when a phase is modulated by one of the first and second SLMs 120 and 130 and an amplitude is modulated by the other, hologram information may be displayed. Furthermore, as each of the first and second SLMs 120 and 130 includes a partial complex modulation panel capable of modulating an optical field of a hologram, the amplitude and the phase are modulated by a combination of the two partial complex modulation panels, and thus, hologram information may be displayed.

In the holographic display device 100 according to an embodiment, the SLM 150 may be provided to represent 50% or more and less than 100% of full complex information.

For example, when an entire range of a phase of a hologram optical field is $[-\pi, \pi]$, the SLM 150 according to an embodiment has a phase range of, for example, $[-0.5\pi, 0.5\pi]$, to represent 50% of an entire complex domain. The above representation of a partial complex domain may be implemented by providing one of the first and second SLMs 120 and 130 as an SLM capable of partial phase modulation, and the other as an amplitude modulation panel, or providing a partial complex modulation panel as each of the first and second SLMs 120 and 130 and modulating the amplitude and the phase by a combination of two partial complex modulation panels.

Referring back to FIG. 3, in the holographic display device 100 according to an embodiment, the processor 170 may control the SLM 150 by employing an algorithm for calculating hologram information according to the representation of a partial complex domain by the SLM 150.

In this state, the algorithm for controlling the SLM 150 may be prepared to set the phase of a target hologram to be constant or random, and to calculate and apply a CGH on a surface of the SLM 150 by back-propagating it.

The algorithm may be provided such that a phase of a target hologram is reproduced while representing a limited random value within a limit allowed by a complex representation range of the SLM 150.

When the phase of a target hologram is set to be random, the algorithm may be provided to reproduce a hologram having a limited random phase, and furthermore, limit the phase of a CGH calculated on the surface of the SLM 150 to fit to a partial complex domain that is representable in the SLM 150 by back-propagating it.

For example, the algorithm may be optimized such that a difference between the amplitude of a hologram reproduced from a CGH with a limited phase and the amplitude of a hologram that is initially set becomes less than a target value, thereby reproducing a hologram having a limited random phase.

Furthermore, the algorithm may be provided to correct imperfection of a system through learning of a system parameter. The system parameter may include non-uniformity of an incident light pattern, an alignment error of the SLM 150, and the like.

For example, when each of the first and second SLMs 120 and 130 of the SLM 150 includes a plurality of pixel arrays, and a partial complex domain is represented by the combination of the first and second SLMs 120 and 130 arranged parallel to each other, the algorithm may be provided to optimize a CGH by estimating an alignment parameter of the first SLM 120 and the second SLM 130.

In another example, the algorithm may be provided to optimize a CGH by using information of $f_{system}$ that is implicitly reflected in an image obtained by directly capturing a hologram implemented by the holographic display device 100 according to an embodiment.

Furthermore, as an algorithm for learning a system parameter and an algorithm for optimizing a CGH are complementary to each other in an actual implementation of the holographic display device 100 according to an embodiment, the two algorithms may be used in combination with each other.

According to the holographic display device 100 according to an embodiment, by controlling the SLM 150 to represent a partial complex domain by the combination of the first and second SLMs 120 and 130, both of the amplitude and the phase may be modulated, and thus, during hologram reproduction, the 0th-order DC noise, the conjugate signal noise, and the like in the viewing window may be removed so that a sufficient viewing window may be secured.

Furthermore, by controlling the SLM 150 by employing an algorithm for calculating hologram information according to the representation of a partial complex domain by the SLM 150, an area of 50% or more and less than 100% of the entire complex domain may be modulated, and thus, a hologram may be reproduced without information loss.

A holographic display device according to an embodiment may further include an additional configuration to remove high-order diffraction noise generated due to an aperture size of a pixel of the SLM 150.

Figure 5:
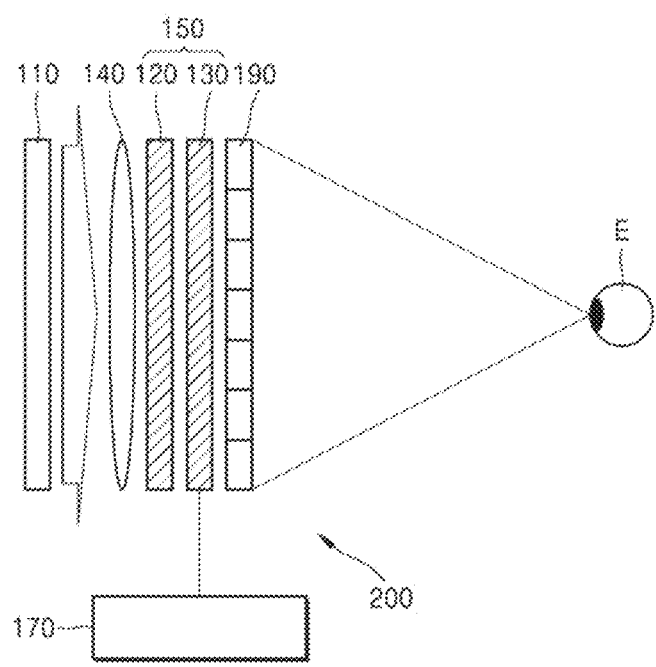
FIG. 5 schematically illustrates a holographic display device according to an embodiment.
Figure 6:
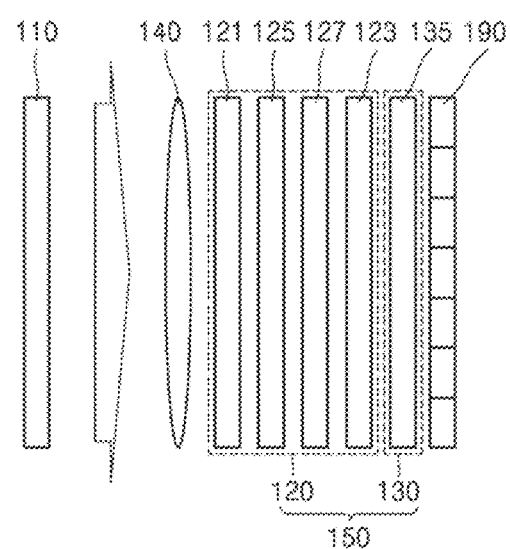
FIG. 6 illustrates a structure of further including an anti-diffraction filter, compared with the spatial light modulator of FIG. 4.

FIG. 5 schematically illustrates a holographic display device 200 according to an embodiment. FIG. 6 illustrates a structure further including an anti-diffraction filter 190. Comparing FIGS. 5 and 6 with FIGS. 3 and 4, the holographic display device 200 is different from the holographic display device 100 by further including the anti-diffraction filter 190 to remove high-order diffraction noise generated due to the aperture size of a pixel of the SLM 150.

High-order diffraction noise may occur outside the viewing window due to the aperture size of a pixel of the SLM 150. By further including the anti-diffraction filter 190, such high-order diffraction noise may be removed.

Accordingly, by combining the SLM 150 capable of partial complex modulation with the anti-diffraction filter 190, the holographic display device 200 having a limit-less viewing window may be implemented.

According to the holographic display devices 100 and 200 according to the above-described embodiments, as the processor 170 controls the SLM 150 that represents a partial complex domain by employing an algorithm for calculating hologram information according to the representation of a partial complex domain, a target hologram may be reproduced without information loss.

According to the holographic display devices 100 and 200 according to the above-described embodiments, an optical field, that is, a CGH, to be modulated in the SLM 150 may be obtained by back-propagating a hologram optical field.

Figure 7:
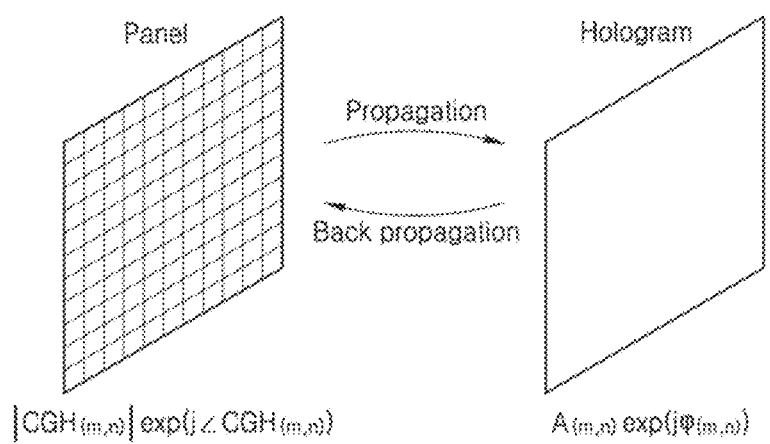
FIG. 7 illustrates the calculation principle of a computer-generated hologram (CGH) with respect to a hologram to implement.

FIG. 7 illustrates the calculation principle of a CGH with respect to a hologram to implement.

Referring to FIG. 7, the hologram to be displayed by the holographic display devices 100 and 200 according to the above-described embodiments respectively illustrated in FIGS. 3 and 4 and FIGS. 5 and 6 may be described with amplitude information and phase information. When an amplitude and a phase at a pixel (m, n) of the SLM 150 are $A_{(m,n)}$ and $\varphi_{(m,n)}$, respectively, a hologram optical field may be represented by $A_{(m,n)}\exp(j\varphi_{(m,n)})$.

As illustrated in FIG. 7, when the hologram optical field is given, an optical field to be modulated by the SLM 150 to generate the hologram optical field may be obtained by back-propagating the hologram optical field ($A_{(m,n)}\exp(j\varphi_{(m,n)})$), and a result thereof may be represented in the form of $|CGH_{(m,n)}|\exp(j\angle CGH_{(m,n)})$.

Among the first and second SLMs 120 and 130 of the SLM 150, an SLM capable of partial phase modulation may modulate information with respect to a phase ($\angle CGH_{(m,n)}$), and an SLM using an amplitude modulation panel may modulate information with respect to an amplitude $|CGH_{(m,n)}|$.

Furthermore, when each of the first and second SLMs 120 and 130 of the SLM 150 includes a partial complex modulation panel, and a partial complex domain is represented by a combination of the two partial complex modulation panels, each of the partial complex modulation panels may modulate both of the information with respect to a phase ($\angle CGH_{(m,n)}$) and the information with respect to an amplitude $|CGH_{(m,n)}|$.

Figure 8A:
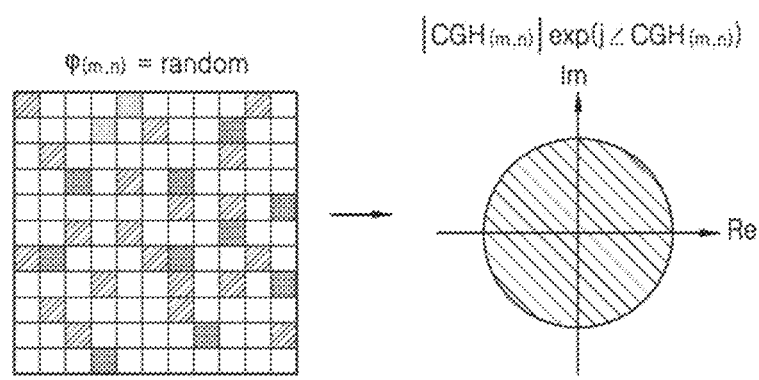
FIGS. 8A and 8B respectively illustrate the distribution of a hologram phase $\varphi_{(m,n)}$ in a complex domain when the hologram phase $\varphi_{(m,n)}$ is random and constant.
Figure 8B:
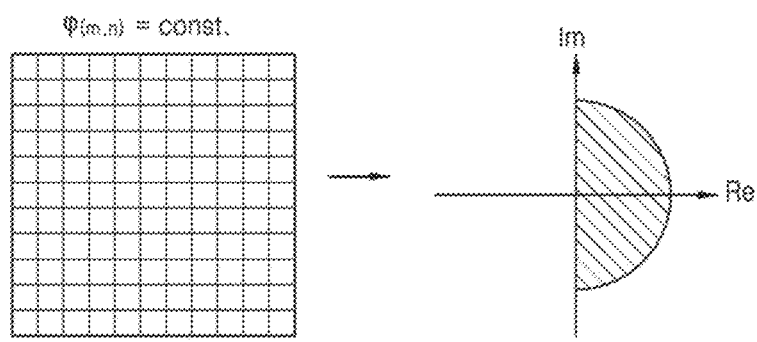

As a human eye is able to sense amplitude information only, hologram phase information, that is, $\varphi_{(m,n)}$, may take any value. FIGS. 8A and 8B respectively illustrate the distribution of a hologram phase $\varphi_{(m,n)}$ in a complex domain when the hologram phase $\varphi_{(m,n)}$ is random (FIG. 8A) and constant (FIG. 8B).

When there is no special limit in a hologram phase value, as illustrated in FIG. 8A, a CGH needed to reproduce a hologram is calculated by using back propagation so that information thereof is distributed evenly over the complex domain.

In contrast, as illustrated in FIG. 8B, when a phase value of a hologram complex field is constant as a single value (e.g., when a value $\varphi_{(m,n)}$ is constant regardless of a pixel), the phase of a back-propagated CGH may be represented as a range of $[-0.5\pi+\alpha, 0.5\pi+\alpha]$ with respect to a specific constant $\alpha$. As the phase is a relative value, the constant $\alpha$ is ignorable, and accordingly, the phase of a back-propagated CGH may be represented as a range of $[-0.5\pi, 0.5\pi]$.

The limitation of the phase range as $[-0.5\pi, 0.5\pi]$, not $[-\pi, \pi]$, may be due to a property of a back propagation kernel. As described above, the optical field at a surface of the SLM 150 may be obtained by back propagating the target hologram. The back propagation may be mathematically expressed as a convolution between the hologram optical field and the back propagation kernel. In this state, as a phase change in a center portion of the back propagation kernel is not great, phase information of a convoluted optical field may still exhibit the same directionality. A CGH may be generated without information loss with only an SLM capable of representing a half range, not the entire range [−π, π], of the phase, by using the above property.

Accordingly, according to the holographic display device 100 according to an embodiment, as the processor 170 controls the SLM 150 by employing an algorithm for calculating hologram information according to the representation of a partial complex domain of the SLM 150, for example, the representation of 50% or more and less than 100% of the full complex information, a CGH may be generated without information loss by employing the SLM 150 that represents a partial complex domain.

Figure 9:
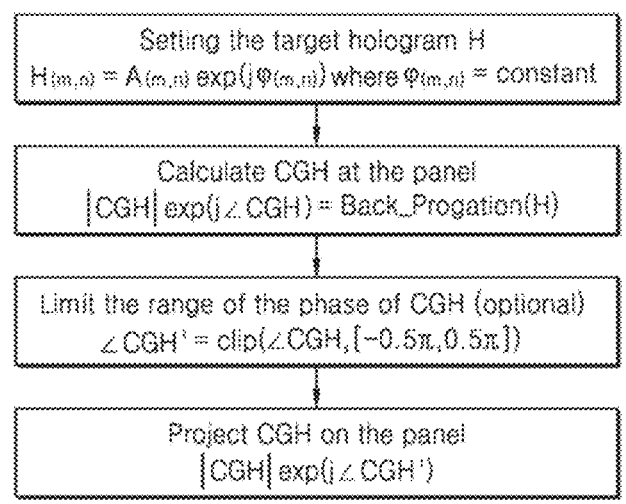
FIG. 9 is a flowchart of an algorithm for implementing a single phase hologram in which a phase value of a hologram complex field is constant as single value, that is, a phase value is constant regardless of a pixel.

An algorithm for implementing a single phase hologram in which a phase value of a hologram complex field is constant as single value, that is, a phase value is constant regardless of a pixel, may be executed, for example, as illustrated in FIG. 9.

Referring to FIG. 9, first, a phase of a target hologram H is set to a constant, and then the phase is back propagated to calculate a CGH at a surface of the SLM 150. Although the phase of a CGH is already distributed in a range of, for example, [−0.5π, 0.5π], there may be a value that is out of the range due to a factor such as noise and the like. Accordingly, a process of forcibly limiting a range of all values may be optionally executed. Finally, when reproduced by the SLM 150 capable of representing a partial complex domain, the target hologram H may be represented without information loss. To include the value that is out of the range of [−0.5π, 0.5π] due to the factor such as noise and the like, the range limitation may be extended within a range allowed by the partial phase modulation of the SLM 150.

When a liquid crystal panel that is often used as an amplitude modulation panel is modified, a phase modulation is possible. In this state, however, only about 60% to 85% of the entire area [−π, π] of a phase may be modulated. When the incomplete phase modulation panel and the amplitude modulation panel are continuously overlapped with each other, a phase modulation area is limited, and thus, the entire complex space may also be modulated by about 60% to 85%.

Accordingly, when one of the first and second SLMs 120 and 130 of the SLM 150 includes a phase modulation panel capable of partial phase modulation, and the other includes an amplitude modulation panel, a partial complex domain may be represented, and as the processor 170 controls the SLM 150 by employing an algorithm for calculating hologram information according to the representation of a partial complex domain by the SLM 150, the target hologram H may be reproduced without information loss.

Furthermore, even when each of the first and second SLMs 120 and 130 of the SLM 150 employs a partial complex modulation panel, a domain of 50% or more of the entire complex space may be modulated, and thus, a single phase hologram may be reproduced without information loss.

Although, in the above description, even when a partial complex modulation panel is applied to the SLM 150, the SLM 150 is described and illustrated, as an example, to use the first and second SLMs 120 and 130 by overlapping the same, the disclosure is not limited thereto. For example, the SLM 150 may include a single partial complex modulation panel only capable of modulating a domain of 50% or more of the entire complex space. In this case, a single phase hologram may be reproduced without information loss.

Figure 10:
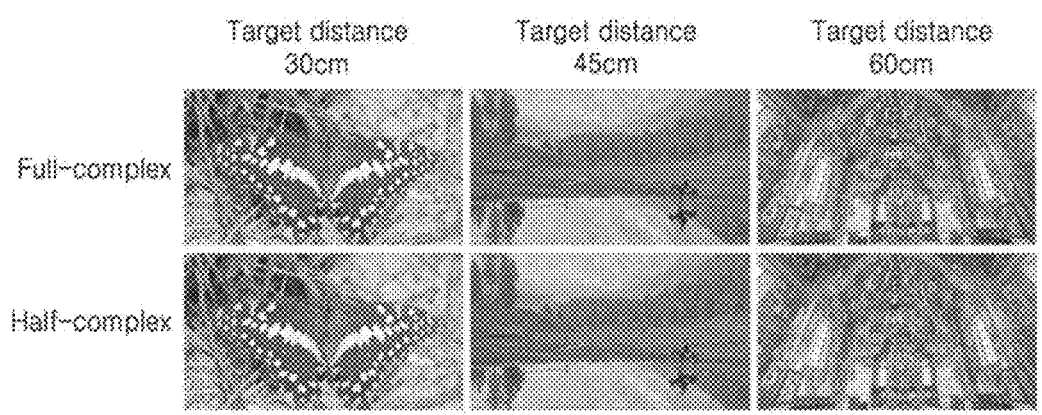
FIG. 10 shows images of a simulation result of a single phase hologram reproduction in a system capable of partial complex modulation, by comparing an adjustable full-complex modulation panel with a phase of $[-\pi, \pi]$ and an amplitude of $[0, 1]$ with an adjustable half-complex modulation panel with a phase of $[-0.5\pi, 0.5\pi]$ and an amplitude of $[0, 1]$.

FIG. 10 shows hologram images generated by an adjustable full-complex modulation panel with a phase of [−π, π] and an amplitude of [0, 1] and images generated by an adjustable half-complex modulation panel with a phase of [−0.5π, 0.5π] and an amplitude of [0, 1], by comparing the same. FIG. 10 shows a simulation result of a single phase hologram reproduction in a system capable of partial complex modulation.

Referring to FIG. 10, an image to be reproduced is set at a position apart from a modulation panel by a certain distance (about 30 cm, about 45 cm, or about 60 cm). The image is set to be a target amplitude, and a phase value is set to 0, and then a CGH to be generated by the modulation panel is calculated. The first row of FIG. 10 shows hologram images obtained by reproducing a CGH calculated assuming that the modulation panel is capable of representing the full complex domain. The second row of FIG. 10 shows hologram images reproduced after limiting a phase range of the calculated CGH when the modulation panel is capable of representing half of the complex domain. It may be seen that hologram reproduction is possible without image quality loss regardless of a target distance, for example, with the half of complex domain representation only, in comparison with a complete complex modulation panel.

Accordingly, as in the holographic display devices 100 and 200 according to the above-described embodiments, when the SLM 150 is provided to represent a partial complex domain, and the SLM 150 is controlled by employing an algorithm for calculating hologram information according to the representation of a partial complex domain of the SLM 150, in comparison with the complete complex modulation panel, a hologram without image quality loss may be reproduced with the complex domain representation only of 50% or more and less than 100%, for example, with the half of complex domain representation.

Figure 11:
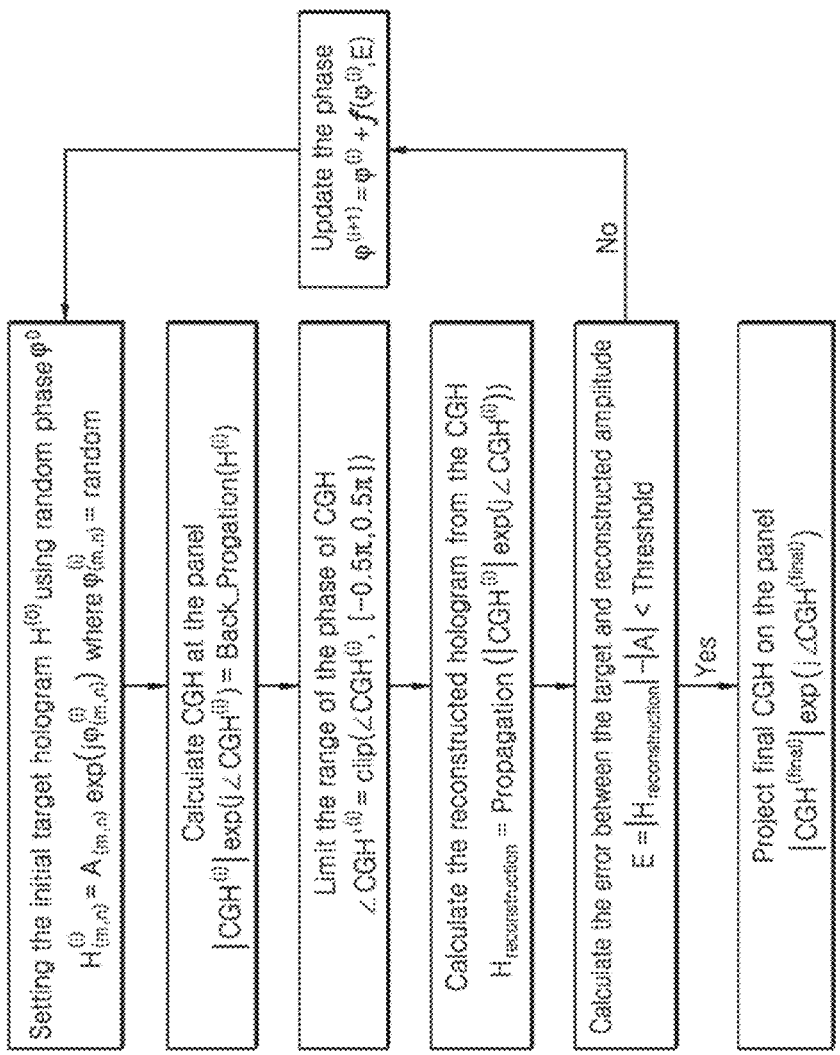
FIG. 11 is flowchart of a partial complex modulation algorithm for random phase hologram reproduction, when a hologram complex field is a random phase, not a single phase.

When a hologram complex field is a random phase, not a single phase, a partial complex modulation algorithm for random phase hologram reproduction may be executed as illustrated in FIG. 11.

FIG. 11 shows an algorithm for random phase hologram reproduction. As illustrated in FIG. 8A, when a hologram phase has a random value that has no limit, information of a CGH may be distributed over the entire complex domain. However, according to the holographic display devices 100 and 200 according to the above-described embodiments, as the SLM 150 is provided to represent a partial complex domain, when a hologram complex field is a random phase, not a single phase, by employing the algorithm of FIG. 11, a 'limited random phase' hologram that is optimized to fit to a partial complex domain may be reproduced.

Referring to FIG. 11, first, the phase of a target hologram is set to be random, and a CGH is calculated at the SLM 150 and then a phase value of the CGH may be limited to fit to a complex domain that is representable. The amplitude of a hologram $H_{reconstruction}$ that is reconstructed from the limited CGH with the limited phase value may be calculated, and when a difference, that is, an error E between the amplitude of the reconstructed hologram and an amplitude $|A_{(m,n)}|$ of the initially set target hologram is sufficiently small, it may be seen that a random phase hologram is represented without information loss. When the error E is great, the phase of a hologram may be re-corrected by reflecting the error, and a sequential optimization may be performed so that the error E becomes less than the target value. When a finally obtained $CGH^{(final)}$ is projected to the SLM 150 that is capable of representing a partial complex domain, a hologram with a limited random phase may be reproduced. By extending a range limit of [−0.5π, 0.5π] within a range allowed by the partial phase modulation of the SLM 150, a representation range of a limited random phase may be increased or the error E may be reduced.

According to the holographic display device 100 according to an embodiment, when the SLM 150 includes the first and second SLMs 120 and 130 to represent a partial complex domain, image loss may be generated due to an alignment error or an incomplete alignment between the first and second SLMs 120 and 130. In an ideal process, when two or more SLMs (120 and 130) are successively coupled, the positions of pixels should be the same with respect to a light propagation direction, but in practice, it is difficult to obtain perfect alignment.

Accordingly, it is necessary to overcome a system process error by optimizing a CGH by estimating alignment parameters (horizontal and vertical position difference, rotation, distance, and the like between the first and second SLMs 120 and 130) of the system with feedback of images directly captured by the system during the process.

Figure 12:
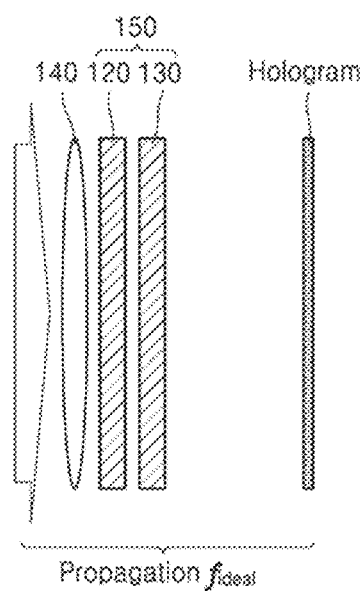
FIGS. 12 and 13 illustrate a comparison between a general CGH calculation method and a CGH calculation method considering the instability of a system.
Figure 13:
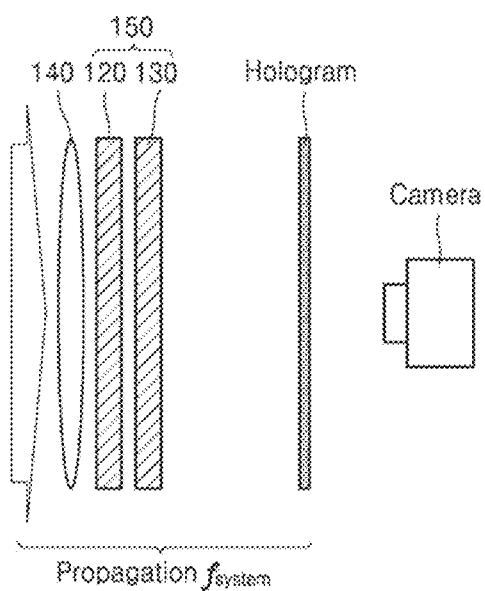

FIGS. 12 and 13 show a comparison between a general CGH calculation method and a CGH calculation method considering the instability of a system.

Referring to FIG. 12, when calculating a CGH by a general calculation method, it is assumed that a system propagation function $f_{ideal}$ that describes propagation of light from a light source, that is, a backlight unit, to a hologram, is ideal. Accordingly, in this case, a non-uniform incident light pattern, an alignment error between panels forming the SLM 150, and the like may not be considered, and an actually reproduced hologram undergoes image quality deterioration.

In contrast, as illustrated in FIG. 13, when an actual hologram is captured using a camera while a panel, that is, the SLM 150, projects a CGH, a camera image may implicitly reflect information about a system propagation function $f_{system}$ of an actual system including, e.g., the SLM 150 and the light source. Accordingly, a system process error may be overcome by estimating system alignment parameters (horizontal and vertical position differences, rotation, distance, and the like between the first and second SLMs 120 and 130) with feedback of images directly captured by a camera included in the system, or by optimizing a CGH in a direction in which an error between a captured image and a target image decreases.

Figure 14:
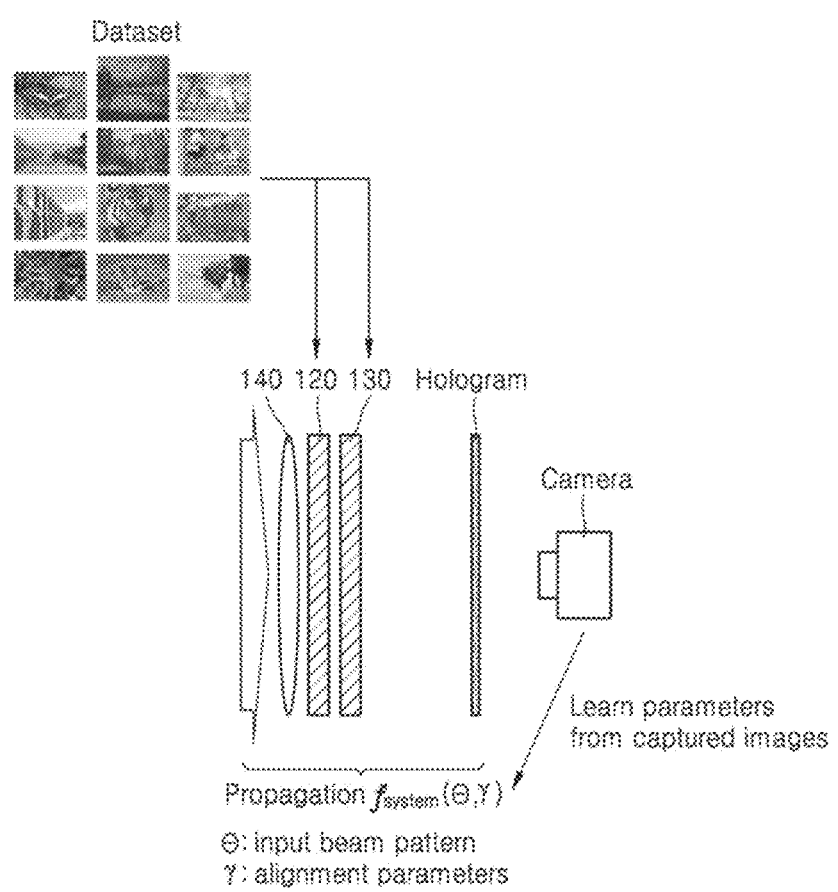
FIGS. 14 and 15 illustrate an embodiment of correcting an alignment error between spatial light modulators or the non-uniformity of an incident light source, when a system is configured by overlapping two sheets of spatial light modulators.
Figure 15:
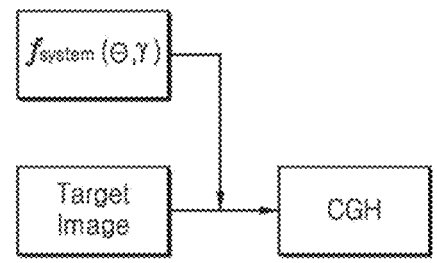

FIGS. 14 and 15 illustrate an embodiment of correcting an alignment error between the first and second SLMs 120 and 130 when a system is configured by overlapping two sheets of the first and second SLMs 120 and 130, or non-uniformity of illumination light provided by an incident light source, for example, a backlight unit.

Referring to FIGS. 14 and 15, the system propagation function $f_{system}$ may be modeled by a function of parameters γ(horizontal and vertical position differences, rotation, a distance, and the like between the first and second SLMs 120 and 130) indicating an alignment between the first and second SLMs 120 and 130, and θ indicating an incident light source. In this case, a plurality of sheets of CGH complex information generated with respect to a dataset is projected to the first and second SLMs 120 and 130, and then formed hologram images are captured using a camera. A hologram image predicted with $f_{system}$ modeled with respect to a given CGH may be expressed by Mathematical Expression 1.

$$f_{system}(CGH, \theta_i, \gamma_i) \qquad \text{[Mathematical Expression 1]}$$

When γ and θ are updated every time as in Mathematical Expression 2 in a direction in which a loss function that reflects an error between the predicted image and a captured image $I_{capture}$ decreases, estimated values of γ and θ with respect to an actual system may be obtained.

[Mathematical Expression 2]

$$\gamma_{i+1} \leftarrow$$
$$\gamma_i - \alpha \frac{\partial (\text{loss}(I_{capture}, f_{system}(CGH, \theta_i, \gamma_i)))}{\partial (\gamma_i)}$$

$$\theta_{i+1} \leftarrow$$
$$\theta_i - \beta \frac{\partial (\text{loss}(I_{capture}, f_{system}(CGH; \theta_i, \gamma_i)))}{\partial (\theta_i)}$$

Through the above learning process, finally, $f_{system}$ (γ, θ) may be modeled close to the actual system, and as illustrated in FIG. 15, a CGH may be calculated considering the instability ($f_{system}$(γ, θ)) of the system with respect to a new hologram (target image) by using the information.

As illustrated in FIGS. 14 and 15, the system propagation function $f_{system}$ may be directly estimated. The estimation of the system propagation function may be performed, e.g., after an alignment process of the first and second SLMs 120 and 130 constituting the SLM 150, an assembly process of the holographic display devices 100 and 200 according to the above-described embodiments, or the completion of a system assembly.

In another example, a CGH may be optimized by using information of $f_{system}$ that is implicitly reflected in an image obtained by directly capturing a hologram implemented by the holographic display devices 100 and 200 according to the above-described embodiments. In this case, an image obtained by directly capturing, by using a camera, a hologram generated by a currently projected $CGH_i$ may be given as expressed by Mathematical Expression 3.

$$I(CGH_i; \theta, \gamma) \qquad \text{[Mathematical Expression 3]}$$

The image quality of a hologram may be improved by updating a CGH every time, as expressed by Mathematical Expression 4, in a direction in which a loss function that reflects an error between the captured image and a target image $I_{target}$ to show decreases.

[Mathematical Expression 4]
$$CGH_{i+1} \leftarrow$$
$$CGH_i - \alpha \frac{\partial (\text{loss}(I_{target}, I(CGH_i; \theta, \gamma)))}{\partial (CGH_i)}$$

In the actual implementation of the holographic display devices 100 and 200 according to the above-described embodiments, since the algorithm for learning a system parameter and the algorithm for optimizing a CGH are complementary to each other, the algorithms may be used in combination with each other.

As described above, according to the holographic display devices 100 and 200 according to the above-described embodiments, as the SLM 150 represents a partial complex domain by the combination of the first and second SLMs 120 and 130, both of the amplitude and the phase may be modulated, and thus, during hologram reproduction, the 0th-order DC noise, the conjugate signal noise, and the like in the viewing window may be removed, thereby securing a sufficient viewing window.

Furthermore, a hologram may be reproduced without information loss by controlling the SLM 150 by employing an algorithm for calculating hologram information according to the representation of a partial complex domain by the SLM 150.

Furthermore, by further including the anti-diffraction filter 190, high-order diffraction noise may be removed as well, and by combining the SLM 150 capable of partial complex modulation with the anti-diffraction filter 190, the holographic display devices 100 and 200 no having a limit of viewing window may be implemented.

According to a holographic display device according to an embodiment, a target hologram may be reproduced without information loss by controlling an SLM that represents a partial complex domain by employing an algorithm for calculating hologram information according to the representation of a partial complex domain.

Furthermore, a hologram may be reproduced without information loss by controlling an SLM by employing an algorithm for calculating hologram information according to the representation of a partial complex domain of the SLM.

Furthermore, as both of an amplitude and a phase may be modulated by an SLM that represents a partial complex domain, during hologram reproduction, noise in a viewing window may be removed so that a sufficient viewing window may be secured.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims and their equivalents.

What is claimed is:

1. A holographic display device comprising:
   a spatial light modulator representing a partial complex domain and reproducing a hologram by diffracting light; and
   a processor configured to control the spatial light modulator by employing an algorithm for calculating hologram information according to representation of the partial complex domain of the spatial light modulator,
   wherein the spatial light modulator comprises a first spatial light modulator and a second spatial light modulator arranged parallel to each other, each of the first spatial light modulator and the second spatial light modulator comprising a plurality of pixel arrays, and
   wherein the spatial light modulator represents the partial complex domain by a combination of the first spatial light modulator and the second spatial light modulator, and
   wherein the first spatial light modulator and the second spatial light modulator share a common optical axis;
   wherein the spatial light modulator is provided to represent 50% or more and less than 100% of full complex information; wherein the algorithm sets a phase of a target hologram to be constant or random, and calculates and applies a CGH on a surface of the spatial light modulator by back propagating the phase of the target hologram; wherein the algorithm allows the phase of the target hologram to be reproduced by representing a limited random value, within a limit allowed by a complex representation range of the spatial light modulator; wherein the algorithm, when setting the phase of the target hologram to be random, limits a phase of the CGH calculated on the surface of the spatial light modulator to fit to the partial complex domain that is representable by the spatial light modulator, by back propagating the phase of the target hologram; wherein the algorithm reproduces the hologram with a limited random phase by optimizing such that a difference between an amplitude of a reconstructed hologram reproduced from a limited CGH having a limited phase and an amplitude of an initially set hologram becomes less than a target value.

2. The holographic display device of claim 1,
   wherein the first spatial light modulator is capable of partial phase modulation, and the second spatial light modulator comprises an amplitude modulation spatial light modulator.

3. The holographic display device of claim 2,
   wherein the second spatial light modulator comprises a TN-LCD panel.

4. The holographic display device of claim 2,
   wherein the first spatial light modulator comprises:
   a first polarizer,
   a modulation panel comprising the plurality of pixel arrays,
   a quarter wave plate, and
   a second polarizer, and
   wherein the first polarizer, the modulation panel, the quarter wave plate, and the second polarizer are sequentially arranged.

5. The holographic display device of claim 4,
   wherein the modulation panel comprises a TN-LC panel.

6. The holographic display device of claim 1,
   wherein each of the first spatial light modulator and the second spatial light modulator comprises a partial complex modulation panel.

7. The holographic display device of claim 1, further comprising an anti-diffraction filter removing high-order diffraction noise generated due to an aperture size of a pixel of the spatial light modulator.

8. The holographic display device of claim 1, further comprising a backlight unit providing coherent and collimated illumination light.

9. The holographic display device of claim 1, further comprising an anti-diffraction filter removing high-order diffraction noise generated due to an aperture size of a pixel of the spatial light modulator.

10. The holographic display device of claim 1, further comprising a backlight unit providing coherent and collimated illumination light.

11. The holographic display device of claim 1,
    wherein the algorithm corrects an imperfection of the device through learning of a system parameter.

12. The holographic display device of claim 11,
    wherein the system parameter comprises a non-uniformity of an incident light pattern or an alignment error of the spatial light modulator.

13. The holographic display device of claim 12,
    wherein the spatial light modulator comprises a first spatial light modulator and a second spatial light modulator arranged parallel to each other, each of the first spatial light modulator and the second spatial light modulator comprising a plurality of pixel arrays,
    wherein the spatial light modulator represents the partial complex domain by a combination of the first spatial light modulator and the second spatial light modulator,
    wherein the system parameter comprises an alignment parameter of the first spatial light modulator and the second spatial light modulator, and wherein the algorithm optimizes the CGH by estimating the alignment parameter.

14. The holographic display device of claim 1, wherein the algorithm for calculating the hologram information is based on alignment of the first spatial light modulator and the second spatial light modulator.

* * * * *